United States Patent [19]

Lowe

[11] Patent Number: 5,030,357
[45] Date of Patent: Jul. 9, 1991

[54] OIL/GREASE RECOVERY METHOD AND APPARATUS

[75] Inventor: John G. Lowe, Pequannock, N.J.

[73] Assignee: Lowe Engineering Company, Lincoln Park, N.J.

[21] Appl. No.: 581,047

[22] Filed: Sep. 11, 1990

[51] Int. Cl.$^5$ ............................ B01D 15/02; C02F 9/00
[52] U.S. Cl. ..................................... 210/669; 210/671; 210/799; 210/804; 210/259; 210/456; 210/923
[58] Field of Search ............... 210/663, 669, 671, 799, 210/801, 804, 242.3, 242.4, 247, 259, 456, 923, 924, 532.1

[56] References Cited

U.S. PATENT DOCUMENTS

| | | | |
|---|---|---|---|
| 4,051,024 | 9/1977 | Lowe et al. | 210/671 |
| 4,268,396 | 5/1981 | Lowe | 210/923 |
| 4,957,629 | 9/1990 | Smith et al. | 210/456 |

Primary Examiner—Ivars Cintins
Attorney, Agent, or Firm—Wyatt, Gerber, Burke and Badie

[57] ABSTRACT

An apparatus and method for separating hydrophobic materials in liquid state from an aqueous liquid or hydrophilic liquid, for separating debris from such liquid, or for purifying hydrophobic materials in liquid state are disclosed. An improved strainer for such apparatus and method is also disclosed. The apparatus and method employ at least one rotatable disk to which hydrophobic materials are attracted and retained; scraper blades to scrape the hydrophobic materials from the disk into a discharge tube from which said materials flow to a pump situated in the apparatus. The pump pumps the materials out of the apparatus. The pump is preferably driven by the same motor which rotates the disk. The strainer has an upper mesh portion and a lower portion where the walls and bottom are solid. The strainer also has an internal diverter plate. Influent containing debris strikes the plate and debris settles in the strainer and is retained in the non-mesh portion thereof. Alternatively, the strainer can be a removable, flexible strainer which, when full of debris, is emptied.

34 Claims, 9 Drawing Sheets

OIL/GREASE RECOVERY METHOD AND APPARATUS

BACKGROUND OF THE INVENTION

1. Field of the Invention

This invention relates to an apparatus and method for recovering oil, grease, and like hydrophobic materials from a water bath. This invention can be used for the recovery of oil, grease, and petroleum products, or for the recovery of cooking (vegetable or animal) oil or grease, or for the recovery and/or purification of hydrophobic materials including solid materials such as lard, bacon fat, and the like. Further, this invention relates to the apparatus and methods of commonly owned U.S. Pat. Nos. 4,051,024 and 4,268,396, each of which being incorporated herein by reference. Familiarity with these patents and the references cited therein is assumed.

2. Description of the Related Art

Lowe U.S. Pat. No. 4,051,024 relates to employing at least one rotatable plastic disk, partly immersed in the contaminated (oil-containing) fluid bath. The disk is rotated at a slow speed and the oil sticks to the disk. A scraper blade removes the oil stuck on the disk and it flows, by gravity, into an oil collector. The disk is motor driven. The accumulating system shown in U.S. Pat. No. 4,051,024 consists of conductor channels which, by gravity, feed the oil to a collector.

In a publicly available embodiment of U.S. Pat. No. 4,051,024, an eccentric was connected to the shaft which rotated the disk. The eccentric drove a pivot arm in an up and down motion to drive the piston of a stroke pump, i.e., the embodiment had a stroke pump. This pump pumped out an oil collector (sump) which collected the oil fed by gravity discharge from the scraper assembly. In this embodiment, the pump needed to be primed and the disk moved slowly; not fast enough to prime the pump. The thought behind making that embodiment of U.S. Pat. No. 4,051,024 was to provide a mechanism to recover oil from oil spills. However, it was learned that for an embodiment of U.S. Pat. No. 4,051,024 to be used with oil spills, required a large disk, 4' to 8' in diameter, and the plastic disc required a metal back-up disk (otherwise the plastic disk would bend and warp). Not only was such an embodiment, big, bulky and plagued with problems, but it was costly and required a large capital investment. Thus, that embodiment was unsuccessful, and is believed to be of no practical utility, although about a handful of such mechanisms may still be in use.

Neither this publicly available embodiment, nor U.S. Pat. No. 4,051,024, teaches or suggests the present invention, particularly, the pump system and the elimination of the sump.

Lowe U.S. Pat. No. 4,268,396 is like U.S. Pat. No. 4,051,024 in some respects. However, U.S. Pat. No. 4,268,396 relates to an oil recovery apparatus and method for use with restaurant dishwashing apparatus. It separated grease and/or oil from the restaurant dishes and/or utensils. In this patent, the disk is also rotated by a motor. As to collection of the recovered grease or oil, this patent merely provides a gravity discharge tube. Since the contaminated fluid in this setting contains debris such as cigarette butts, food particles, and the like, a strainer is provided before the oil recovery bath.

Currently there is much attention being directed to preserving the environment by both social and legal action, e.g., environmental laws and enforcement. For example, commercial quantities of waste liquids often cannot be simply dumped into the public sewer system. Hydrophobic materials (oil and grease) in waste water must be separated from the water. Many local sewer authorities require users to remove hydrophobic materials such as oil and grease from waste water before it is dumped into the sewer system. However, even if the waste oil and grease is separated, often the waste cannot be burned because large amounts of hydrophobic materials are dangerous to incinerators. Further, debris, including sand, silt and the like must also be separated from such waste water and hydrophobic materials.

It is thus desirable to make the apparatus and methods of the aforementioned Lowe et al patents simpler, inexpensive, easier to install, more efficient and easier to perform in order to produce waste water relatively free of oil, grease and debris, so that the waste water may be dumped into a public sewer system. In general, it is desirable to improve the apparatus and methods of the aforementioned Lowe et al Patents. It is further desirable to provide improvements in, inter alia, the collection of the recovered oil or the strainer of the apparatus and methods of Lowe et al. In addition, it is desirable to improve the strainer of Lowe et al so that the apparatus and methods of Lowe et al can be employed for different uses, such as purifying hydrophobic materials.

It is therefore an object of this invention to provide an improved apparatus and method for recovering hydrophobic materials such as oil, grease, etc. from a water bath or pool. It is also an object of this invention to provide improvements on the methods and apparatus of the previous Lowe et al Patents. Further it is an object of this invention to provide an apparatus and method of recovering hydrophobic materials wherein the collection of the recovered materials and the straining of contaminated fluid are improved. It is also an object to provide such an apparatus and method having an improved strainer. Further, it is an object of this invention to provide an improved strainer, which may be used in other devices.

SUMMARY OF THE INVENTION

The present invention provides an apparatus and a method for separating hydrophobic materials from water and hydropholic fluids, for separating debris from both of these types of materials, or for purifying hydrophobic materials such as oil and grease. The apparatus and method are improvements over those of U.S. Pat. Nos. 4,051,024 and 4,268,396.

The present invention provides an apparatus including a reciprocating pump and a strainer containing a diverter plate. The strainer is adapted to remove both large debris and small debris, such as sand, silt and the like. To provide a purer recovered hydrophobic product. The apparatus has a reciprocating pump which does not require priming, i.e., has positive head or is automatic priming, driven by the same motor which drives the disk. Consequently, the apparatus of the present invention is easier to install than those of U.S. Pat. Nos. 4,051,024 and 4,268,396, and is simpler, inexpensive, less capital intensive and far more efficient than the devices of those In particular, the present invention provides an apparatus for separating hydrophobic materials in liquid state from an aqueous liquid or hydrophilic liquid, for separating debris from such liquids or for purifying hydrophobic materials in liquid state, comprising:

(a) A container having at least two compartments, a strainer compartment and a recovery compartment. The container has an influent passageway into the strainer compartment. The strainer compartment contains at least one strainer. In one embodiment that strainer is a box-like container whose upper wall portions are of mesh. A pipe leads from the strainer compartment to the recovery compartment.

(b) A pipe carries an influent flow of liquid to the strainer. The strainer, in one embodiment, has a hollow body and a diverter plate. The body has an upper portion, a lower portion, sidewalls, a top and a bottom. The upper portion of the sidewalls is of mesh, the lower portion of the sidewalls and the bottom is solid and the pipe flows the influent liquid into the upper portion of the body. The diverter plate is positioned in the hollow body at its upper portion a distance from the inflow pipe and perpendicular to the pipe (flow means) so that the influent flows into the strainer, and strikes the diverter plate causing debris to sink to the lower portion of the strainer and be retained. After straining, the liquid flows through the mesh to the recovery compartment.

(c) At least one disk whose outer surfaces attract and retain hydrophobic materials. The disk is mounted on a rotating shaft and positioned between the end walls of the recovery compartment. The disk is substantially normal to the surface of the liquid (bath) in the recovery compartment. As the disk is rotated it is partially immersed in the liquid, and its surface attraction and retention is sufficient for the hydrophobic material (oil, grease etc.) to be lifted by the disk.

(d) At least one baffle in the recovery compartment, which is spaced from and adjacent a rear wall and has a top edge normally above the liquid in the recovery compartment. This baffle inhibits the flow of liquid over the top of the baffle or over the top of the wall of the recovery compartment and has an opening thereunder for the flow of effluent liquid from the recovery compartment.

(e) A readily removable bridge member carried by support means in the recovery compartment. The bridge member has a midportion formed with a cutout which straddles the disk as it is rotated. The bridge member is mounted such that its midportion is substantially normal to the surface of the liquid and is removable from the disk by upward movement from the recovery compartment.

(f) At least one pair of flexible scraper blades mountable on the bridge member. Each of said scraper blades is a plastic flexible wiping blade in engagement with one side of the disk. Each blade is bent so that its edge scrapes the attracted hydrophobic material (oil, grease etc.) from a side of the disk after the disk emerges from the liquid. The scraper blades, as mounted, are substantially vertical, near the zenith of the disk, engage the sides of the disk, and substantially equally restrain the rotating disk from unwanted sidewise movement.

(g) Means for removably securing the scraper blades to the bridge member.

(h) A self-priming reciprocating pump (stroke pump) within the recovery compartment. The pump is for pumping out the hydrophobic material scraped from the disk.

(i) At least one fluid conductor pipe to receive the scrapings of hydrophobic material from a downward end of the blade. That pipe retains the distal end of the scraper blade (curved into its scraping condition) and carries the scrapings by gravity to the pump to provide the pump with positive head, which avoids priming the pump; And, (j) Motive power means (motor) to rotate the disk, at the speed, and to power the pump.

Preferably the pump is above the level of the liquid in the recovery compartment and the fluid conductor pipe (oil, grease pipe) is above the pump. This allows gravity to flow the hydrophobic materials to the pump. Since the pump has positive head, it is self priming.

As an alternative to the strainer (element (b)) the device can have a flexible mesh strainer within the strainer compartment, when the separation of smaller debris, such as sand and silt, is not critical.

The present invention further provides a method employing such an apparatus.

The present invention also provides a strainer for separating debris from liquid by having an influent flow of liquid flow into the strainer and an effluent flow of liquid flow out of the strainer. The strainer comprises: a pipe to carry the influent flow of liquid to the strainer; a hollow body; and, a diverter plate. The body has an upper portion, a lower portion, sidewalls, a top and a bottom. The upper portion of the sidewalls is of mesh, their lower portions and the bottom are solid. The flow means carries the influent flow of liquid into the upper portion of the body and the diverter plate is positioned in the hollow body at the upper portion, a distance from said flow means and perpendicular to the flow means. The influent flow flows into the strainer and strikes said diverter plate causing debris to sink to the lower portion of the strainer and be retained thereat. The liquid, after straining, flows through the mesh and becomes the effluent flow of liquid.

DETAILED DESCRIPTION

Referring to all of the Figures, which show a preferred embodiment of the apparatus of the invention, rotating disk 10 is carried and rotated by shaft 12. The apparatus can have a plurality of disks in side-by-side arrangement or arranged front-to-back. Disk 10 is preferably made of high density polyethylene (HDPE) or of any material to which hydrophobic materials such as grease oil and the like are attracted and retained, and hydrophilic materials are not so attracted and retained. Alternatively, disk 10 may be a metal disk coated with high density polyethylene or with any material having an affinity for attracting and retaining hydrophobic materials. If disk 10 is of HDPE, it is preferred that it be of stress relieved HDPE.

Figure 12:
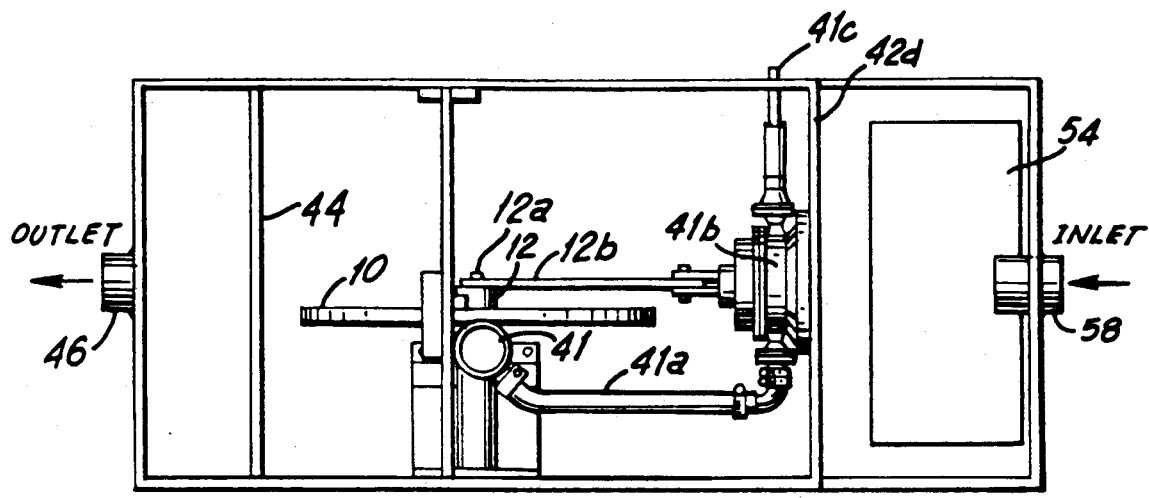
FIG. 12 shows a top view of an apparatus of the invention using the strainer shown in FIGS. 5, 8, 9, and 10.
Figure 13:
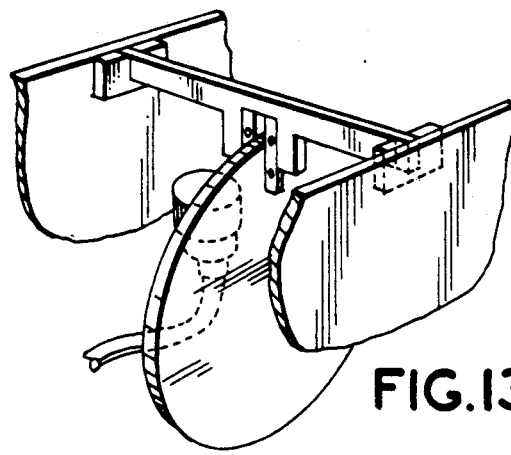
FIG. 13 shows an isometric view of the rotary disk, scraper blades and discharge tube of the invention.
Figure 14:
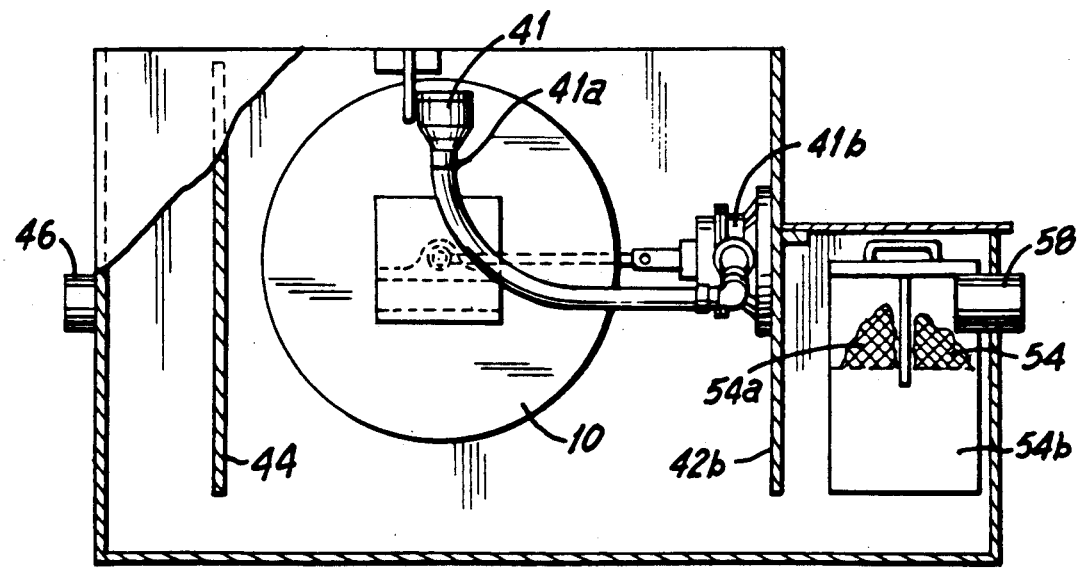
FIG. 14 shows a side view of an apparatus of the invention.
Figure 15:
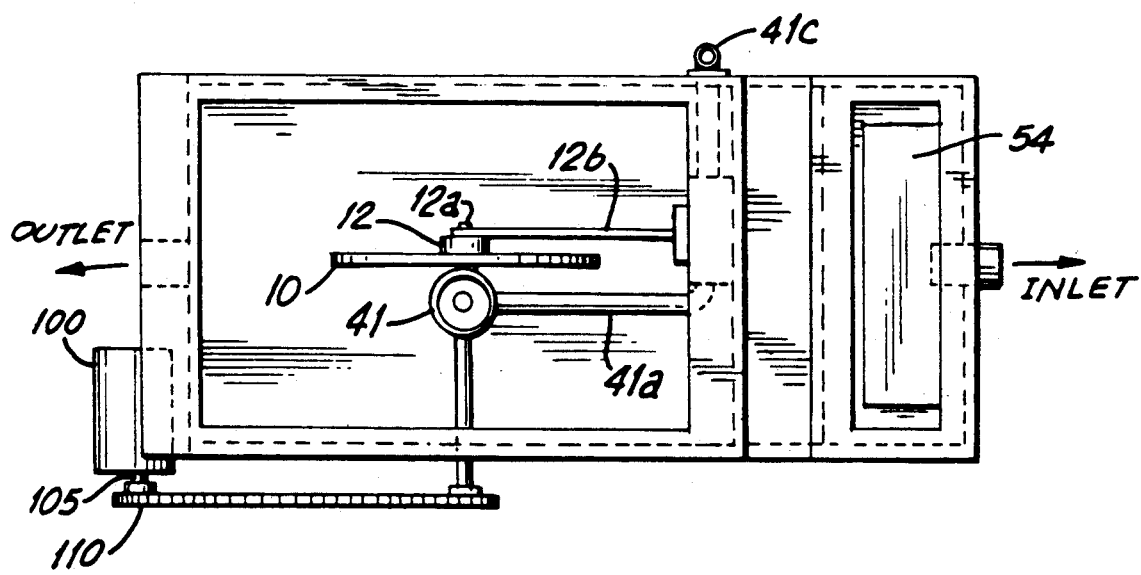
FIG. 15 shows a top view of an apparatus of the invention.
Figure 17:
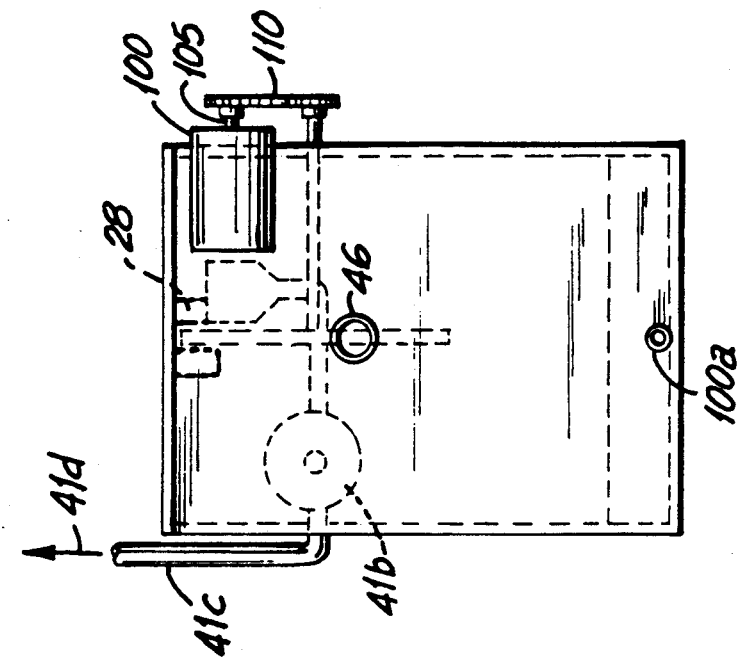
FIG. 17 shows a side view of an apparatus of the invention from the outlet side.
Figure 16:
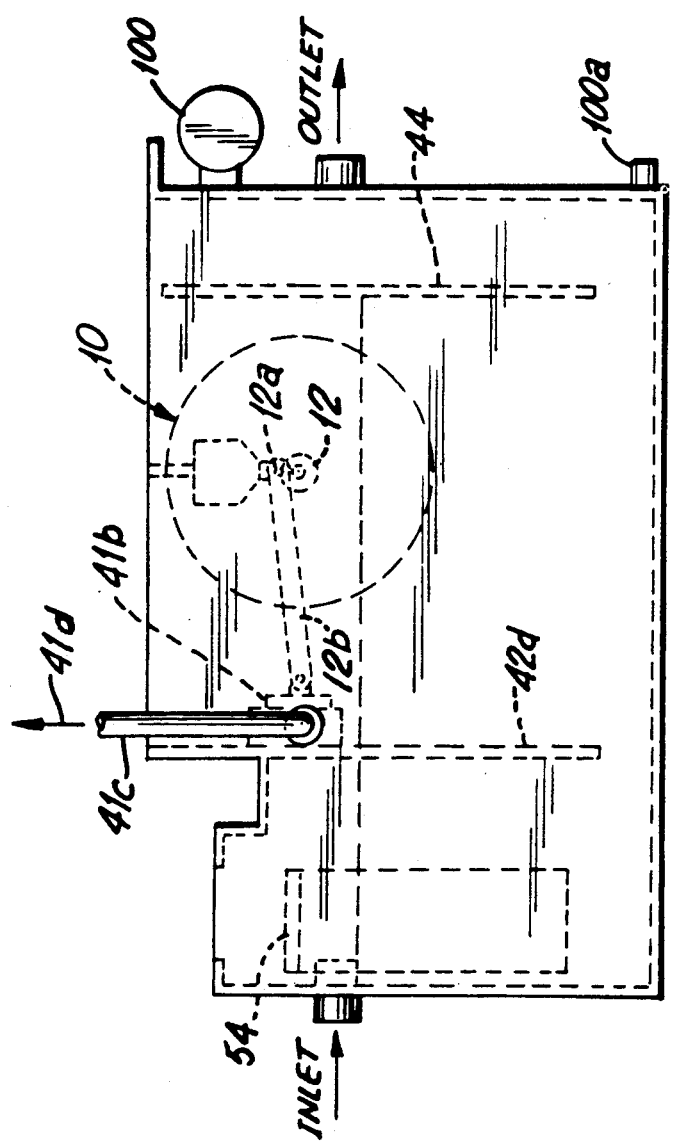
FIG. 16 shows a side view of an apparatus of the invention.

As especially shown in FIGS. 12 and 16, shaft 12 is connected to eccentric 12a which drives pump arm 12b. The eccentric 12a i preferably positioned for a 1¼" stroke of arm 12b, i.e., about ⅝" off center. Motor 100 can be an air or an explosion proof electric motor, and is preferably mounted to the side of container 42. Motor shaft 105 of Motor 100 rotates drive chain 110 which rotates shaft 12 (See FIG. 17). Drive chain 110 alternatively may be a belt. Pump arm 12b is connected to the piston of reciprocating stroke pump 41b (mounted to wall 42d, preferably above the level of liquid in container 42). Thus, motor 100 drives both disk 10 and pump 41b. Pump 41b is preferably a high hat diaphram pump. The volume pumped by pump 41b can be increased by increasing the off set of eccentric 12a, i.e., by increasing its distance from the center of rotation of 12.

Since pump 41b is within container 48, the apparatus is easier to install than previous devices, especially if it is installed in a pit formed in a floor. The discharge tube 41 is preferably positioned higher than pump 41b so there is a positive head and no need to prime pump 41b.

The rotation of shaft 12 is at very low speed, typically from 6 to 18 rpm, e.g., 10 rpm, and usually about 6 to 7 rpm, so that turbulence in the water is kept at a minimum. The hydrophobic fluids, e.g., oil, grease, etc., float and are attracted and carried by the sides of rotating disk 10. Since shaft 12 rotates at a very low speed, the pumping strokes of diaphragm pump 41b are also slow, thereby increasing the life of pump 41b. The rate at which shaft 12 and disk 10 rotate may be increased or decreased depending upon the hydrophobic material being recovered; and, more particularly, depending upon the viscosity of the hydrophobic material being recovered. The greater the viscosity the slower the rotation of disk 10 and shaft 12, for example, the disk 10 is rotated slower to remove thick grease than for oil. With heating of container 42, the viscosity of the hydrophobic material can decrease thereby allowing for a faster rotation of disk 10.

As mentioned earlier, previous devices relied upon gravity to feed recovered grease or oil to a container positioned below the discharge tube, e.g., the container was in a pit. In these previous devices, the container had to be manually removed; or, were emptied by pumps which did not have positive head (i.e., were not self priming).

Figure 6:
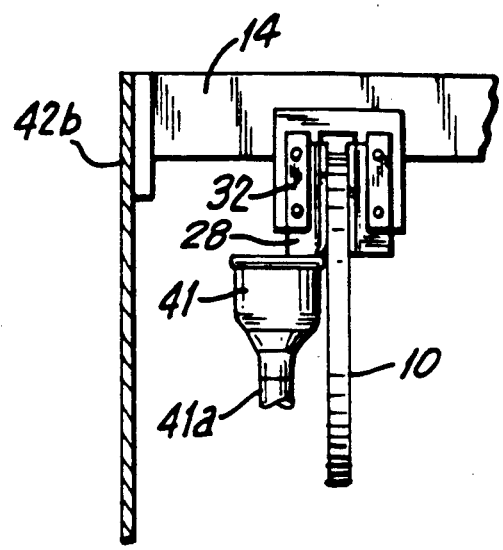
FIG. 6 shows a partly diagrammatic and fragmentary end view showing the discharge tube in position.
Figure 6A:
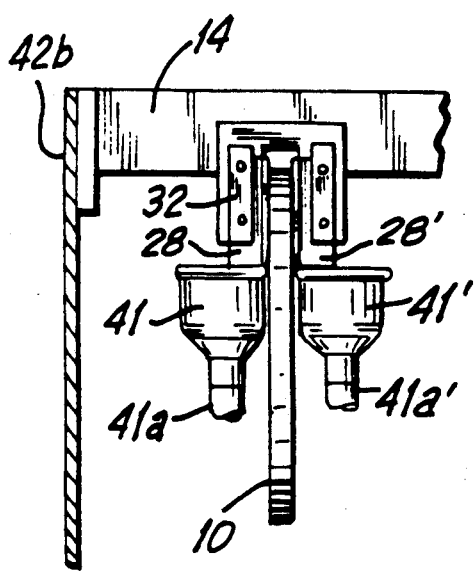
FIG. 6A shows a partly diagrammatic and fragmentary end view showing a plurality discharge tubes.
Figure 6B:
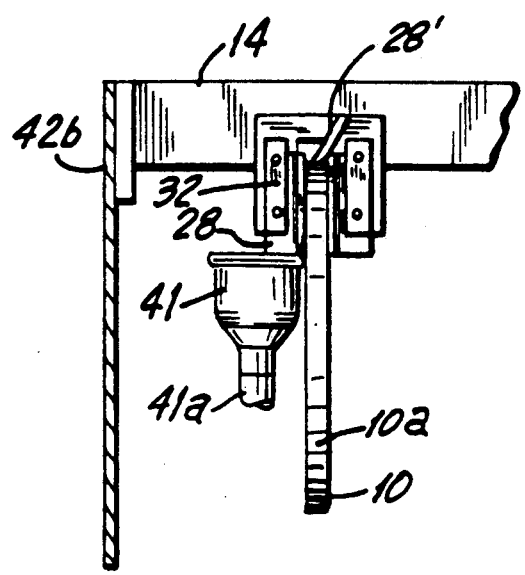
FIG. 6B shows a partly diagrammatic and fragmentary end view showing a scraper blade for the edge of the disk and a single discharge tube.

By the present invention, hydrophobic material (oil, grease, etc.) is deposited in discharge tube 41, which is preferably funnel shaped (See FIGS. 6, 6A, 6B). The hydrophobic material then flows by gravity through conduit 41a to pump 41b which pumps the oil, grease, etc., out through discharge tube 41c, as shown by arrow 41d. Pump 41b preferably has an outlet flapper valve (not shown). If pump 41b is to pump the hydrophobic material to a level at or below the level of pump 41b, it is preferred that a counterweight be installed on the outlet flapper valve to hold the outlet head and help keep the prime. Discharge tube 41c can empty into a container for proper removal of the oil, grease, etc. Further, discharge tube 41c can empty into a container at or above the level of discharge tube 41, even at or above floor level. For instance, with eccentric 12a positioned for a 1¼" stroke (about ⅝" off-center), discharge tube 41c having a ¾" diameter, shaft 12 rotating at about 6½ rpm, and pump 41b being a high hat diaphram pump, the oil, grease etc. can easily be pumped to a container at least 11 feet above the apparatus.

Thus, the apparatus and the method of this invention eliminate the need to manually remove the container of recovered oil, grease, etc., i.e., handling of hydrophobic materials is reduced. Moreover, by employing gravity discharge from conduit 41a to pump 41b, pump 41b is self priming (i.e., has positive head); and, the slow rotation of shaft 12 is sufficient to power the pump. The apparatus of the present invention is hereby accordingly simpler, less capital intensive, easier to install, and more successful and useful than previous devices. Further, the present invention is not as big or bulky as previous devices and does not suffer from their problems.

Alternatively, discharge tube 41c can empty into a tank (not shown). The tank can be for storing accumulated recovered oil, grease, etc. until it is to be taken away for proper disposal. The tank can be on any level since pump 41b permits discharge to levels higher than the apparatus. The tank can itself have a separate pump (not shown) run by a second motor (also not shown) for emptying the accumulated recovered oil, grease, etc. therefrom. The tank can also have a float switch (not shown) so that the separate pump for the tank does not run dry.

In the operation of an apparatus of this invention when disk 10 hits the surface of the liquid in container 42, the hydrophobic material is attracted thereto and retained thereon as disk 10 continues its rotation. Thus, the hydrophobic material rides on the disk as a portion of it is submerged in the liquid. As the disk thereafter rides upward towards the scraper blades (28 or 28 and 28'), hydrophilic material flows off of the disk. Increasing the size (diameter) of disk 10 allows more time for hydrophilic liquid (or water) to flow off of the disk before scraping; thereby providing for better (purer)

recovery of hydrophobic material and more efficient operation of the apparatus. When using a HDPE or HDPE-coated disk, it has been found that excellent results are achieved when disk 10 has a diameter of about 13" to 20", preferably about 20" and the static liquid level in container 42 is such that disk 10 is submerged about two to three inches in the liquid. This is to be particularly contrasted with the embodiment of U.S. Pat. No. 4,051,024 discussed under the Background of the Invention, where the disk was 4' to 8' in diameter.

As shown in FIG. 6A, an apparatus of this invention can have a plurality of discharge tubes, shown as 41 and 41'. A plurality of discharge tubes is useful to increase the throughput of the apparatus. When a plurality of discharge tubes is used, conduit 41a has a T-connection (not shown) so that conduit 41a' is connected to conduit 41a and scrapings flowing from discharge tube 41' flow into conduit 41a' through the T-connection, to conduit 41a and then to pump 41b. As well as having a plurality of discharge tubes, an apparatus of this invention can also have an additional scraper blade 28' as shown in FIG. 6B and discussed more fully below.

Figure 1:
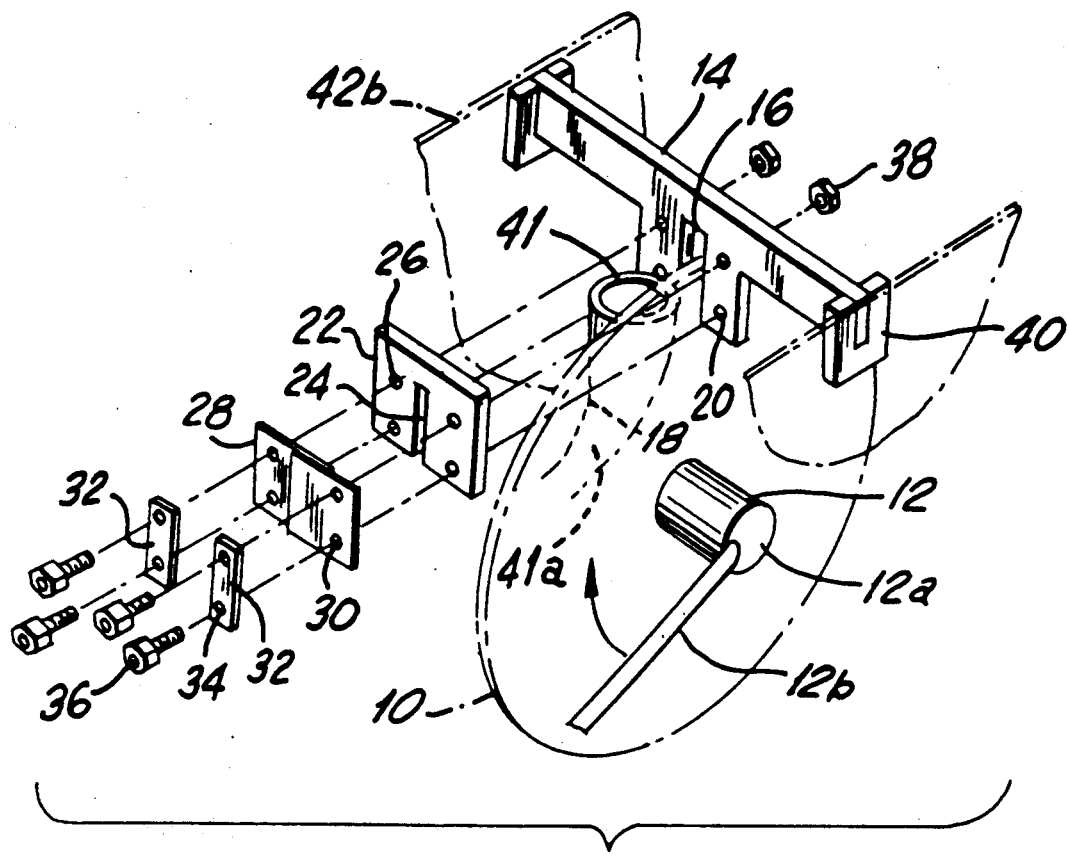
FIG. 1 shows an expanded isometric view showing a rotary disk of the invention.

As shown in FIG. 1, bridge member 14 is preferably made with a cutout 16 to carry ears 18 disposed downwardly on each side of the rotating disk 10. Through holes 20 (depicted as four in number) are formed in the ears 18 for the removable attachment of scraper blades 28. As shown, there is a spacer block 22 which as depicted has a narrower slot 24 than cutout 16. The width of this slot 24 is only slightly wider than the thickness of the rotating disk 10. Also formed in spacer block 22 are through holes 26 (depicted as four in number) which are spaced and sized to correspond to the through holes 20 formed in the bridge member 14. Two strips of plastic of any suitable material, preferably, Nylon (trademark of duPont), preferably one-sixteenth of an inch in thickness, form scraper blades 28. Nylon blades scraping a HDPE or HDPE-coated disk are preferred since Nylon scraping the HDPE leaves the HDPE feeling free of hydrophobic materials to the touch.

Figure 2:
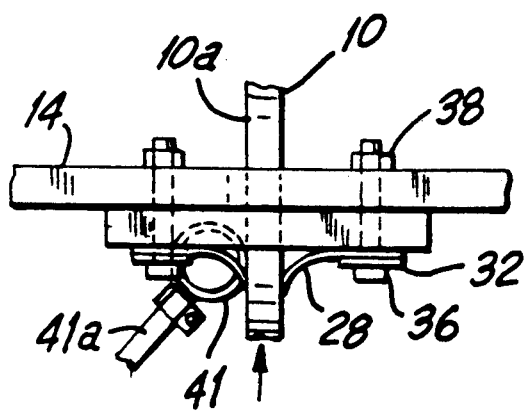
FIG. 2 shows a fragmentary top view showing the assembly of a pair of scraper blades and the discharge tube in position.
Figure 3:
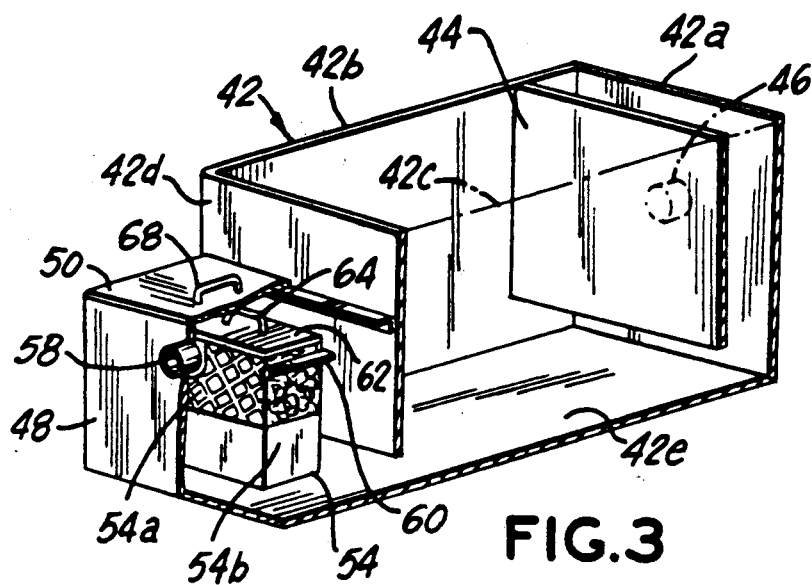
FIG. 3 shows a partly diagrammatic isometric view of a container of the invention, including the strainer.

The two scraper blades 28 are of like configuration and are formed with holes 30 therein. These holes 30 are the same size and spacing as through holes 26 and 20. Retainers 32 may be of thin metal or plastic and have holes 34 formed therein so as to match with holes 30, 26 and 20. Cap screws 36 pass through the aligned holes and are secured in place by means of nuts 38 to retain the scraper blades 28 to the bridge member 14 as seen in FIG. 2. U-shaped members 40 are secured to the inside of the container 42 near its top to carry the bridge member 14.

As shown in FIG. 6B, in addition to scraper blades 28, bridge member 14 can carry additional scraper blade(s) 28' which scrapes edge 10A of disk 10 and causes the scrapings to collect in a discharge tube 41 (and/or 41') on the side of disk 10. Scraper blade 28' can be affixed to bridge member 14 by means of screws and nuts. Spacer block 22 can be provided with additional holes for the screws affixing scraper blade 28' to pass through; and, a retainer can be set in place over scraper blade 28'. A block (not shown) can be used to set scraper blade 28' in place so that the scrapings therefrom go to one side of disk 10 and collect, for example, in discharge tube 41. The edge 10A of disk 10 is usually about ¼".

Bridge member 14 and scraper blades 28 (or 28 and 28') are readily removed from container 42 for replacement or repair. Spacer block 22 is positioned so that holes 20 and 26 are in substantial alignment after which the plastic scraper blades 28 are positioned with the retainers 32 on the outside of the blades. The cap screws 36 are passed through the several holes and are secured by means of nuts 38 to the bridge member 14. In a tightened condition on the bridge member 14 the attached and positioned scraper blades 28 are then brought into position on the disk. Scraper blades 28 are of like length and both blades 28 are positioned on rotating disk 10 as it is rotated toward the bridge member 14. One of the scraper blades 28 engages one side of the rotating disk 10 to remove the grease and/or oil attracted thereto and the other blade 28 engages the other side of disk 10. The scraper blades 28 are designed to engage both sides of the rotating disk to cause it to track straight with no side pressure. This is very important in providing a readily upward removal of this bridge member for repair or adjustment.

The bridge member 14, absent the scraper block 22, may provide for the attachment and support of scraper blades 28 (or 28 and 28'). This permits spacer block 22 to be omitted when scraper blades 28 (or 28 and 28') are mounted in position; for example, as in FIG. 2. The scraper blades 28 and 28' may be as thin as one thirty-second of an inch in thickness when they are of sufficient stiffness. The material and stiffness of these blades determines their thickness.

Referring particularly FIGS. 3, 4, 5, and 7 to 11, which depict the present invention, container 42 is preferably of a rectangular configuration and made of clad sheet metal, stainless steel or with any suitable material which will withstand the conditions under which the apparatus is used. Container 42 has a baffle 44 spaced a short distance from the rear wall 42a. The two opposite side wall portions 42b, of the container assembly, carry the baffle 44. The baffle 44 is spaced a short distance, such as one and half inches, from the bottom 42c of the container. A front wall 42d of container 42 has an inlet (not shown) or may have a passage 45 thereunder for the influent flow of water mixed with grease and/or oil.

A discharge 46 in rear wall 42a carries the outflow of clarified (clean) water after the grease and/or oil have been removed therefrom. A baffle (not shown) similar to baffle 44 may be placed near the front wall 42d of the container so that the influent material can be directed into the central portion of the container 42. Reduced turbulence in the container is provided by these baffles so that the oil recovery, shown in FIGS. 1 and 2, may be utilized. As the disk 10 is rotated it removes the grease and/or oil from the water bath in the container 42. Following the removal of the grease and/or oil, which is accomplished with a minimum of turbulence in the water, the clarified water is discharged from the container.

A filter container 48 is attached to front wall 42d and is preferably a rectangular configuration. A cover 50 is removably carried on the top of the filter container 48 so that its inside may be examined and cleaned. On its top, cover 50 has handle 68 to make removal easy. Handle 68 may alternatively be two side handles. There may be provided an inlet (not shown) in front wall 42d through which the contaminated liquid flows. This inlet may be a round opening in the wall or the wall may stop short of the bottom and provide a passageway 45. When a forward baffle is adjacent to the front wall 42d it insures that turbulence in the central portion of the container 42 is reduced.

Within the filter container 48 is the strainer 54 which is preferably partly of a mesh 54a to confine debris. Preferably, the mesh 54a, has ⅛" diameter openings. Strainer 54 is a hollow box-like member having its upper wall portions formed of mesh. Strainer 54 allows the influent water to pass freely and carry with it the grease and/or oil. In a forward sidewall of the strainer 54 there is provided an inlet which has a slip fit for an inlet tube 58 secured to the outer wall of the filter container 48. This inlet tube 58 is secured to the wall of the filter container 48 and allows the influent flow of contaminated water.

When debris, such as cigarette butts, sand, silt, dirt, particles of food and the like have substantially filled the strainer 54, or on a scheduled basis, the cover 50 of the container is removed and strainer 54 is slid towards the wall 42d to disengage the strainer from the inlet tube 58. By means of handles or grip portions 60, strainer 54 is lifted from the filter container 48. Cover 62 is now removed by handles 64 to clean debris accumulated in the strainer. After this accumulation has been removed the strainer is replaced in the filter container 48. A sharp tap of the upside-down strainer 54 usually removes most or all of the accumulated debris and reinstallation of the same strainer 54 into the filter container 48 is readily accomplished with the strainer being moved in place on the inlet tube 58. Dirty water is then again allowed to flow into the interior of the strainer 54 and then into the container 42. This strainer 54 may be held in its position in the compartment by one or more spacers 65 which engage and/or are secured to the front of the strainer 54 as in FIG. 5. Other support arrangements are presented in other Figures. Strainer 54 is preferably made of stainless steel, but it can be of any material which can withstand the conditions under which the apparatus of the present invention is used.

Figure 7:
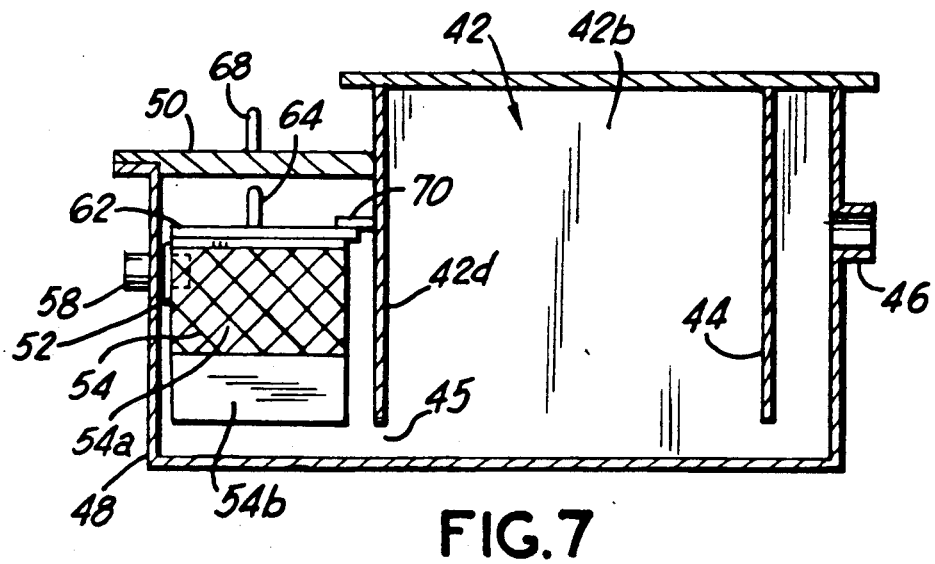
FIG. 7 shows a side view, partly diagrammatic, of the container of the invention, including the strainer.

FIG. 7 shows the main container 42 and the filter container 48. A slot 45 below the separating wall 42d allows the contaminated water flowing from the strainer 54 to pass under the bottom portion of the container wall and flow to a desired level within the main container 42. Shown in this side view is strainer 54 with container cover 62 and handle 64. Cover 50 of filter container 48 has handle 68. On the cover 62 is provided a rearward stop member or members 70 adapted to engage the wall 42d and after the cover 62 is in place to limit the rearward movement of the strainer 54.

Figure 8:
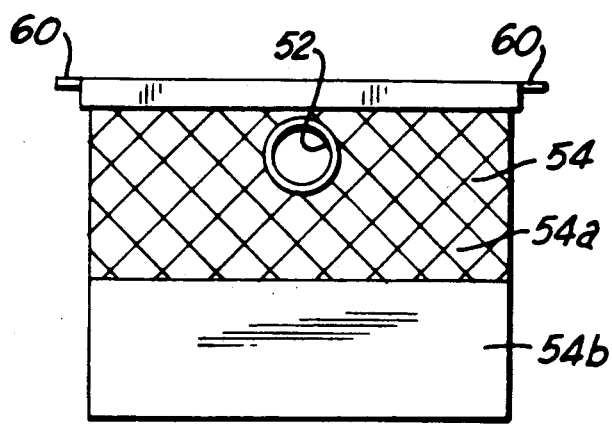
FIG. 8 shows a front view of the strainer.

FIG. 8 shows the filter of FIG. 7 having an inlet 52 which is slidable on inlet tube 58. The top cover 62 has handle 64 thereon or side handles (not shown) as well as rearward stop members 70.

Figure 4:
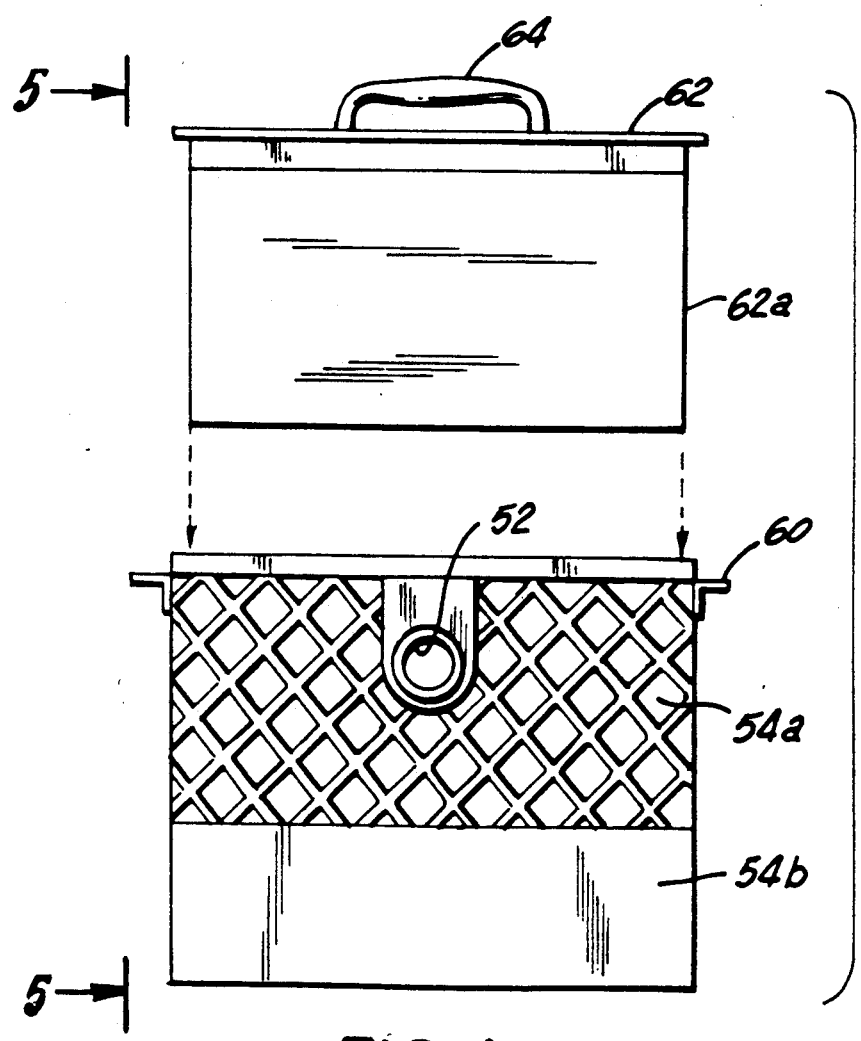
FIG. 4 shows an expanded view of the strainer.
Figure 9:
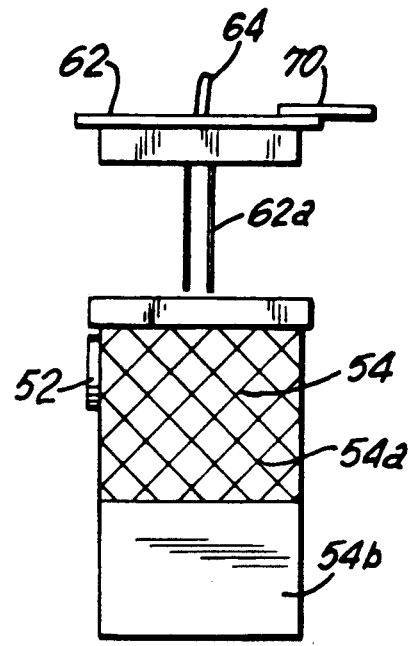
FIG. 9 shows a side plan view of the strainer and cover.

FIGS. 8 and 9 show that the strainer 54 is provided with lifting handles 60 as seen in FIG. 4. These handles (angle iron) provide grasping means for lifting the strainer 54 from within the container 48. As seen in FIG. 7, the front wall 42d has a slot 45 thereunder. No forward baffle is used in this arrangement since the separating wall 42d provides the required baffle arrangement.

Figure 10:
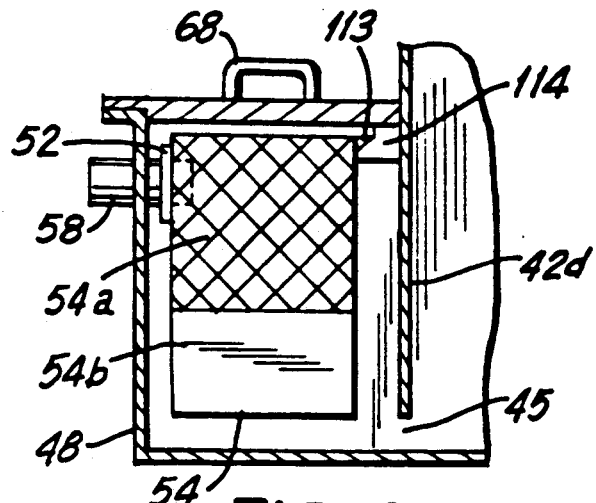
FIG. 10 shows a side view of an arrangement for support of the strainer of FIGS. 5, 8, and 9.

Referring next to FIG. 10 the strainer 54 has a rearwardly extending projection portion 113 which engages stop 114 secured to the wall 42d. In use, the strainer 54 is slid into inlet tube 58 secured to strainer container 48. This strainer, after mounting on the tube 58, is slide rearwardly until projection 113 engages and is stopped by stop 114. This stop prevents unwanted rearwardly movement. The shaped projection portion 113 enables the strainer 54 to be easily lifted from the container 48 for cleaning. The effluent from strainer 54 preferably flows out of the strainer 54 through slot 45 and then under wall 42b.

Figure 11:
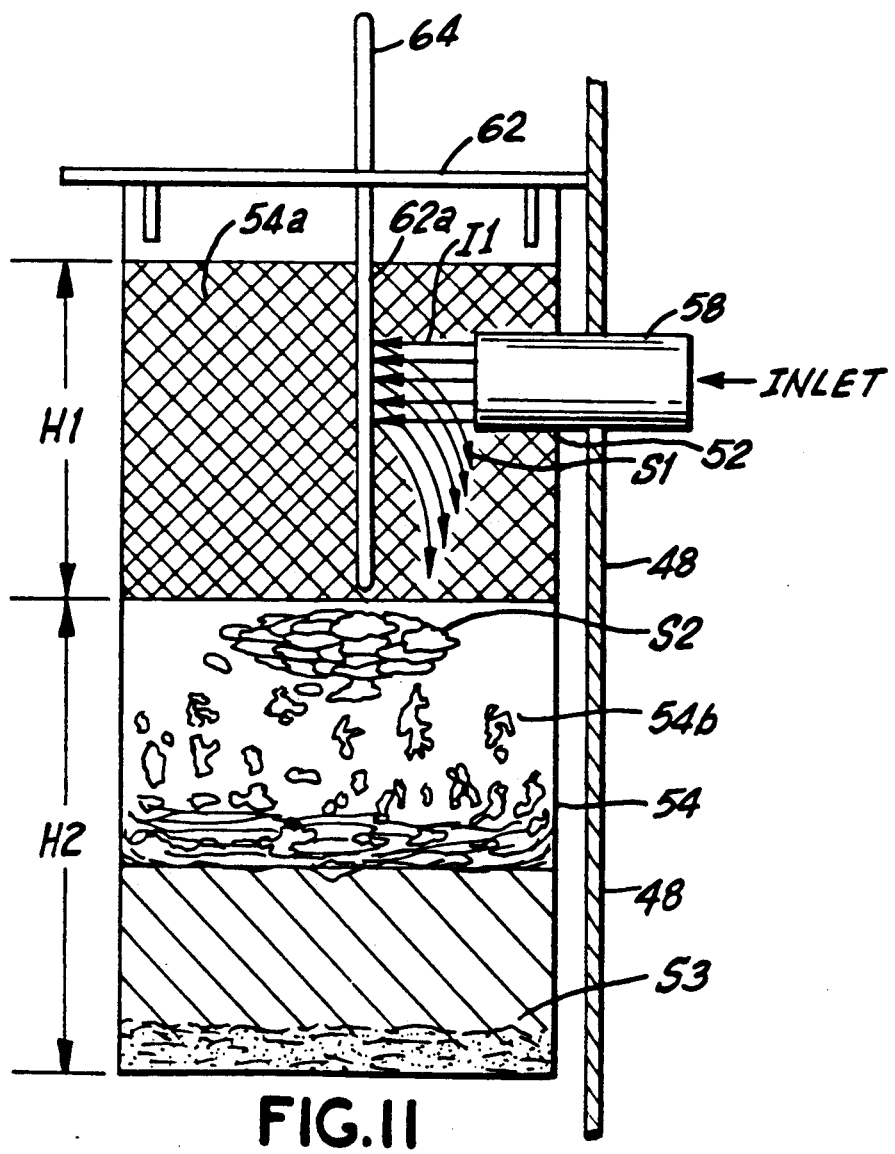
FIG. 11 shows a schematic depiction of the operation of the strainer of FIGS. 5, 8, 9 and 10.

Turning to FIGS. 4 and 11, there is shown an alternative strainer construction to that of FIGS. 4A and 4B (described below); the strainer 54 of FIGS. 4 and 11 is also shown in FIGS. 3, 7, 8, 9, 10 and 14. The strainer cover 62 is provided with diverter plate 62a and the strainer 54 is divided into an upper portion having a mesh 54a walls and a lower portion having solid walls 54b. Diverter plate 62a is positioned within strainer 54 perpendicular to the flow of influent water. The diverter plate 62a is preferably at about the middle of the hollow body of the strainer 54. Diverter plate 62a can be made from 18 gauge steel. The height of the upper portion (having mesh 54a) is designated H1; and the height of the lower portion is designated H2. H1 can be approximately ⅛ to ⅞, preferably ½ of the height of strainer 54; and H2 can be approximately ⅛ to ⅞, preferably about ½ of the height of strainer 54.

The effect of diverter plate 62a and of strainer 54 having mesh 54a and wall 54b is shown in FIG. 11. Influent water containing debris is shown in the Figures as arrow "I" or "inlet". Water or liquid, emerging from the apparatus is shown as arrow "O" or "outlet".

The influent water flows into strainer 54 and hits diverter plate 62a as shown by arrows I1. Solids, designated S1, including sand and silt, drop downwardly from diverter plate 62a causing floating solids S2 which sink to the bottom of the strainer 54 and are retained thereat by solid wall 54b. The waste solids at the bottom of strainer 54 are designated by cross-hatched area S3. Diverter plate 62a preferably extends downwardly into strainer 54 preferably approximately 67–100% of the distance of H1. Accordingly, by employing strainer 54 with diverter plate 62a, purer products—both hydrophobic and aqueous or hydrophilic are recovered than products from previous devices. Tandem strainers or a plurality strainers can be employed, if desired (See U.S. Pat. No. 4,268,396).

Figure 4A:
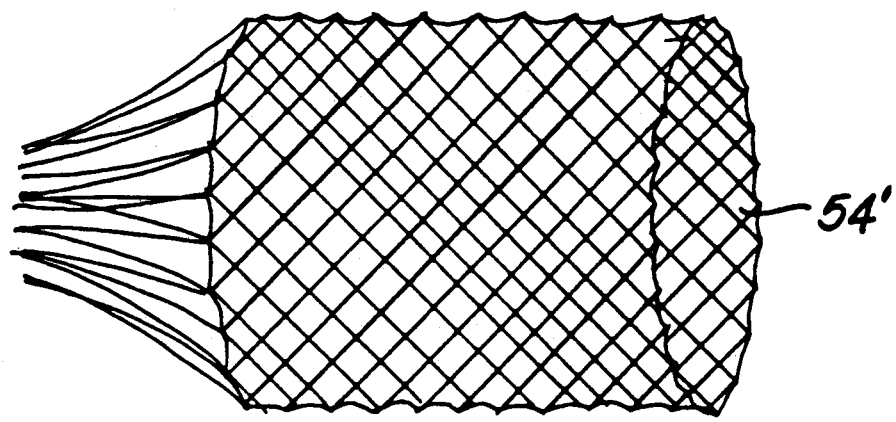
FIG. 4A shows a flexible mesh strainer for use as the alternative strainer of the invention.
Figure 4B:
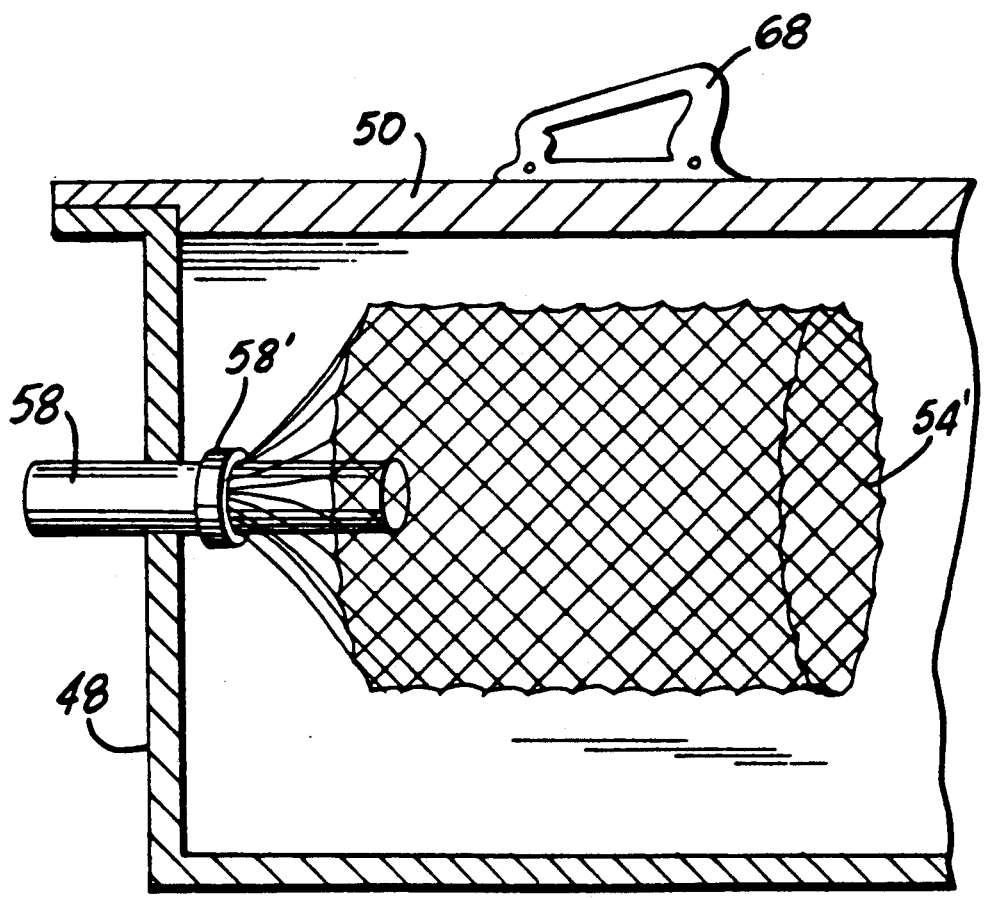
FIG. 4B shows a fragmentary view of the flexible mesh strainer in place in the alternative strainer of the invention (the strainer shown in cross-section).
Figure 5:
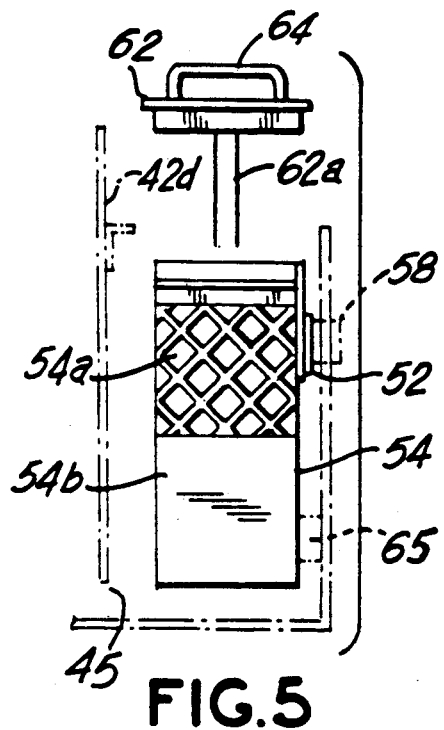
FIG. 5 shows an sideview expanded of the preferred strainer taken on line 5—5 of FIG. 4.

FIGS. 4A and 4B show an alternative flexible strainer 54' for an apparatus of the invention. This strainer 54' can be used in place of strainer 54 when the separation of small debris such as sand and silt is not too critical. The opening of strainer 54' can be on the order of ⅛" or less. Flexible strainer 54' is positioned in container 48 by being removably affixed to inlet tube 58, e.g., by clamp 58'. When flexible strainer 54' is full, it is disconnected from inlet tube 58, and disposed of as solid waste; a new flexible strainer 54' is installed in place of the full one. Thus, flexible strainer 54' can be disposable. Flexible strainer 54' is of any suitable material, e.g. plastic mesh like packaging for produce such as oranges. Alternatively, flexible strainer 54' can be of any suitable material e.g., a cloth or paper or of metal mesh, so long as it is sufficiently porous and durable to allow and withstand the flow of liquid therethrough.

It is to be noted that the use of the strainer 54 or 54' permits a source of waste water such as a dishwasher to be connected directly to the oil and/or grease recovery unit of this invention. It is highly desirable that the grease and/or oil carried by the water to the container 42 be strained as much as possible so that the cover for the container 42, which is not shown, may be infrequently removed. The scraper blades 28, used to remove the grease and/or oil and pump, 41b, wear faster when required to remove and carry the debris from the water in the container. Thus, strainer 54 or 54' reduces wear of the scraper blades 28 and pump. Furthermore, for disposal, recycling or purifying of either the grease and/or oil or the water or liquid discharging from container 42, it is highly desirable to have strainer 54 or 54' operating efficiently and the influent-stream strained as much as possible.

The baffles are arranged and carried in guides within the container. The apparatus, as shown employs only a single rotating disk 10. However, a plurality of disks can be employed, e.g. one in front of the other, if desired, or side-by-side. Container 42 and the filter container 48 are preferably of metal with the removable cover 50 also of a metal so that they are durable. Containers 42 and 48 and cover 50 can also be of any other material which is suitable for the conditions under which the apparatus will be used. The rotation of the disk 10 may be toward the front or toward the rear. The shaft 12 may be rotated by a gear motor of low horse-power and r.p.m.'s. Preferably the strainer 54 is made of metal or plastic and is substantial enough to be self-supporting. The strainer 54 is substantially rigid enough for removal and rough handling during removal of the debris trapped therein.

It is to be noted that the present invention provides the use of its grease and/or oil separating apparatus for use with a dishwashing apparatus as utilized by hotels, restaurants and fast food chains or for use in automobile service centers, e.g. to strain and clean refuse motor oil, or waste water such as water used to wash down the service station at the end of the day; or, for any use where a hydrophobic material needs to be separated from water or hydrophilic liquid and the water or hydrophilic liquid contains debris. The influent stream in such instances includes not only debris, such as discarded food, sand, silt, etc., but also includes a certain amount of grease and/or oil, normally found on the plates of dining patrons or on the floor of a service station. Further, a dishwasher is also used to clean utensils used by the cooks in preparation of food. Many, if not most of these utensils, such as fry pans and the like, have accumulated grease and/or oil coated on their surfaces. In particular, butter, margarine and the like are often found in the dishwasher and in the water used therewith, often requiring the container 42 and the lines thereto and therefrom, e.g. the inlet, conduits 41a, 41c, etc., and the hydrophobic material and the hydrophilic liquid discharged to be heated to at least bring the influent liquid to a temperature sufficient to cause the viscosity of hydrophobic materials to decrease and even cause such materials to be liquified to the extent that they can float and be attracted to the rotating disk 10. For recovering grease, oil, butter and other hydrophobic materials which are normally solid or very viscous at room temperature, it is preferred to heat the influent and the lines to and from containers 42 and/or 48 to a temperature of from about 80° F. to 100° F., preferably 90° F. Heating of liquid in container 42 and/or container 48 can be achieved by an electric heater installed therein. Alternatively, so that conduits 41a, 41c etc. do not clog from the solidification of hydrophobic materials, a water jacket can be attached around these conduits: warm water flows through the water jacket (the temperature of which is controlled by a solenoid); and, from the water jacket warm water then flows into container 42 and/or into container 48 so that the surface of the liquid therein (where hydrophobic materials are floating) is especially heated. It is preferred to heat the liquid in container 42 and/or container 48 (especially in container 42) because as the viscosity of the hydrophobic material decreases, the more easier it is to have the material attracted to and retained on disk 10 and thereby be removed from the liquid in container 42, i.e., heating the liquid in container 42, increases the efficiency of the apparatus.

Likewise, if the apparatus of the present invention is used to recover or purify other hydrophobic materials which are normally very viscous or solid at room temperature, then it is necessary to heat the influent, the container and the outlet lines to a temperature sufficient to reduce the viscosity or liquify the hydrophobic materials, e.g. by heat tracing the lines on the container materials. For instance, animal fats such as lard, bacon fat, or chicken fat normally contain some meat particles or generally debris. Using the strainer 54 and diverter plate 62a and, in general, the apparatus of this invention, these products can be recovered or purified. For example, the apparatus is maintained under sanitary conditions. The fat is heated, and mixed with a sufficient amount of clean water to form an influent stream, and the influent stream is sent into the apparatus of this invention. At discharge tube 41c cleaned fat is emptied, essentially free of debris or meat particles. The water comes out of the outlet and can be recycled for reuse.

FIGS. 6, 12, 14, 15 16 and 17 show various views of an apparatus of the invention. Discharge tube 41 is positioned to collect grease, oil, etc. scraped off of disk 10 by scraper blades 28. Drain 100a is optional and preferred. It is positioned at the bottom of container 42 at the outlet side to allow draining of the container.

In the operation of the present invention, influent flows into inlet 58 and is strained by passing through strainer 54. The fluid flows through baffle 45 into the main area of the container containing disk 10. Motor 100 rotates shaft 12 which causes disk 10 to rotate and pump 41b to pump. Oil, grease, etc. (or hydrophobic material) is attracted to and retained by the sides of disk 10 until scraped off by scraper blades 28. Scraper blades 28 scrape the oil, grease, etc. into discharge tube 41. The oil, grease, etc. flows from discharge Tube 41 to pump 41b (inlet side) out of the apparatus by pump 41b (outlet side). Now essentially free of debris and oil, grease etc. the aqueous or hydrophilic fluid flows out of the apparatus by flowing under outlet baffle 44 and out of outlet 46.

Having thus described in detail preferred embodiments of the present invention, it is to be understood that the invention defined by the appended claims is not to be limited by particular details set forth in the above description as many apparent variations thereof are possible without departing from the spirit or scope of the present invention.

What is claimed is:

1. An apparatus for separating hydrophobic materials in liquid state from an aqueous liquid or hydrophilic liquid, for separating debris from such liquids or for purifying hydrophobic materials in liquid state, comprising:

(a) a container having at least a strainer compartment and a recovery compartment, said container having an influent passageway into the strainer compartment, an effluent passageway leading from the recovery compartment, and fluid conducting means leading from the strainer compartment to the recovery compartment;

(b) at least one strainer disposed in said strainer compartment, and a flow means for carrying an influent flow of liquid to this strainer, said strainer including a mesh and being adapted to remove debris from said liquid and for the liquid to be strained by flowing through said mesh to said recovery compartment;

(c) at least one disk having at least one outer surface to which hydrophobic material is attracted and retained, a rotating shaft upon which said disk is mounted, said disk being disposed intermediate the end walls of the recovery compartment and disposed so that the disk is substantially normal to the surface of the liquid in said recovery compartment and as the disk is rotated it is partially immersed in said liquid, said attraction and retention being sufficient for said hydrophobic material to be lifted by said disk;

(d) at least one bridge member carried in said recovery compartment;

(e) at least one flexible scraper blade having an edge thereon and mountable on the bridge member, said scraper blade when in engagement with the sides of the disk being bent to provide a bias causing said edges to contact the disk and to scrape the attracted hydrophobic material from a side of the rotated disk after this disk emerges from the liquid and prior to the reentry of the rotated disk into the liquid;

(f) means for removably securing the scraper blade to the bridge member so that the blade contacts the disk as it is rotated, (g) a self-priming pump functionally positioned to receive hydrophobic material from said recovery compartment, said pump being adapted to pump out of the apparatus hydrophobic material scraped from said disk by said scraper blades;

(h) at least one fluid conductor pipe positioned to receive the scrapings of hydrophobic material from a downward end of the blade and to carry said scrapings by gravity directly to said pump without a sump-collector and thereby provide said pump with positive head; and, (i) motive power means for rotating the disk at a desired speed and direction and for powering said pump.

2. Apparatus as in claim 1 and further including at least one baffle carried in said recovery compartment, said recovery compartment having front and rear walls, said baffle spaced from and adjacent said rear wall and having a top edge normally above the liquid in the recovery compartment, said baffle being disposed to inhibit the flow of any liquid over the top of the baffle, and an opening under said baffle for the flow of liquid from said recovery compartment as the effluent flow.

3. Apparatus as in claim 1 wherein said bridge member has means to provide a readily removable attachment to said recovery compartment, and said bridge member includes a being positioned so that said cutout in the mounted bridge member straddles the disk as it is rotated, said bridge member in a mounted condition having its mounting midportion disposed in a substantially normal position to the surface of the liquid and removable from the disk by upward movement from the recovery compartment.

4. Apparatus as in claim 1 including at least one pair of flexible scraper blades, one blade being mounted to scrape each side of said disk.

5. Apparatus as in claim 4 wherein said scraper blades in mounted condition are substantially vertical and near the zenith of the disk, said scraper blades in a mounted condition adapted to engage the sides of the disk and to substantially equally restrain the rotating disk to cause said disk to track substantially straight.

6. Apparatus according to claim 5 in which the scraper blades are of nylon and are sufficiently flexible to be bent into arc-like configurations.

7. Apparatus according to claim 6 in which the nylon scraper members are from one thirty-second to one sixteenth of an inch in thickness.

8. Apparatus according to claim 5 in which the strainer is made from metal.

9. Apparatus as in claim 5 in which the strainer is of plastic.

10. Apparatus according to claim 5 wherein the upper mesh portion of the sidewalls of said strainer has openings of about ⅛".

11. Apparatus according to claim 4 wherein there is a plurality of fluid conductor pipes to conduct scrapings.

12. Apparatus according to claim 11 wherein there is a fluid conductor pipe disposed on each side, of each disk.

13. Apparatus as in claim 1 wherein said strainer comprises a hollow body and a diverter plate therein, said body having an upper portion, a lower portion, sidewalls, a top and a bottom, wherein the upper portion of said sidewalls is of mesh, the lower portion of said sidewalls and said bottom is solid, said flow means is positioned to carry the influent flow of liquid into the upper portion of the body, and said diverter plate is positioned in the hollow body at the upper portion a distance from said influent flow means and perpendicular to the flow means so that said influent flow flows into said strainer, and strikes said diverter plate thereby causing debris to sink to the lower portion of the strainer and be retained thereat.

14. Apparatus according to claim 13 in which the strainer compartment is made as an integral portion of the recovery compartment, the strainer is removably carried within the strainer compartment with the strainer being self-supporting and the top comprising a removable cover mountable on said strainer compartment and said diverter plate is attached to the inside of said cover so that when said cover is on said strainer, said diverter plate projects downwardly into said strainer therefrom.

15. Apparatus according to claim 14 in which the influent flow of liquid flows into the apparatus by a tube secured to an outer wall of the strainer compartment with said tube having a short inward extension and a sized aperture formed in the wall of the strainer, the strainer being slid onto the inward extension of this tube to a stop limit so that the strainer does not engage any wall.

16. Apparatus according to claim 15 in which the strainer is removably mounted on an inwardly extending tube by the sliding of the strainer onto and off of the end of the extending tube.

17. Apparatus according to claim 13 wherein said diverter plate is positioned in said strainer at about the middle of the hollow body.

18. Apparatus according to claim 13 wherein said upper portion of said strainer is approximately ½ to ⅔ of the height of the strainer.

19. Apparatus according to claim 18 wherein said upper portion of said strainer is approximately ½ of the height of the strainer.

20. Apparatus according to claim 13 wherein the diverter plate extends downwardly into the strainer for approximately 67–100% of the upper portion.

21. Apparatus as in claim 1 wherein said strainer includes a removable flexible mesh.

22. Apparatus as in claim 21 wherein said flexible mesh comprises a flexible plastic mesh strainer.

23. Apparatus as in claim 1 wherein the pump is above the level of the liquid in the recovery compartment.

24. Apparatus as in claim 1 wherein said motive means comprises a motor attached to the outside wall of said apparatus; said motor rotates the shaft, and the apparatus further comprises an eccentric connected to said shaft, and a pump arm connected at one end to said eccentric and at the other end to said pump so that by rotating the shaft, the motor causes the pump to pump.

25. Apparatus as in claim 1 wherein the disk is of high density polyethylene.

26. Apparatus as in claim 1 wherein said pump is within said recovery compartment.

27. Apparatus according to claim 1 wherein said scraper blade is of flexible plastic.

28. Apparatus according to claim 1 wherein said bridge member further comprises a scraper blade mounted at a midportion to scrape the edge of the disk and cause scrapings to flow to the fluid conductor pipe.

29. A strainer for separating debris from liquid by flowing an influent flow of liquid flow into the strainer and an effluent flow of liquid flow out of the strainer after straining, said strainer comprising
a hollow body;
a flow means for carrying the influent flow of liquid to the strainer mounted on said body; and
a diverter plate;
said body having an upper portion, a lower portion, sidewalls, a top and a bottom,
wherein the upper portion of said sidewalls is of mesh, the lower portion of said sidewalls and said bottom is solid, said flow means is positioned to carry the influent flow of liquid into the upper portion of the body, and said diverter plate is positioned in the hollow body at the upper portion, a distance from said flow means and perpendicular to the liquid flow from said flow means,
so that said influent flow flows into said strainer and strikes said diverter plate thereby causing debris to sink to the lower portion of the strainer and be retained thereat and the liquid, after straining, to flow through said mesh as the effluent flow of liquid.

30. A strainer according to claim 29 made of metal.

31. A strainer according to claim 30 wherein the upper mesh portion of the sidewalls of said strainer has openings of about ⅛".

32. A strainer according to claim 29 made of plastic.

33. A method for separating hydrophobic materials in liquid state from an aqueous liquid or hydrophilic liquid, for separating debris from such liquids, or for purifying hydrophobic materials in the liquid state comprising:
(a) straining said liquid wherein the strainer comprises:
a strainer for separating debris from liquid by having an influent flow of liquid flow into the strainer and an effluent flow of liquid flow out of the strainer after straining, said strainer comprising:
a flow means for carrying the influent flow of liquid to the strainer;
a hollow body; and
a diverter plate;
said body having an upper portion, a lower portion, sidewalls, a top and a bottom, wherein the upper portion of said sidewalls is of mesh, the lower portion of said sidewalls and said bottom is solid, said flow means is positioned to carry the influent flow of liquid into the upper portion of the body, and said diverter plate is positioned in the hollow body at the upper portion of the body, and said diverter plate is positioned in the hollow body at the upper portion, a distance from said flow means and perpendicular to the flow means,
so that said influent flow flows into said strainer and strikes said diverter plate thereby causing debris to sink to the lower portion of the strainer and be retained thereat and the liquid after straining to flow through said mesh as the effluent flow of liquid,
(b) passing said effluent flow from said strainer to a recovery compartment, and
(c) subjecting said effluent flow in said recovery compartment to a means for separating and recovering hydrophobic liquid from hydrophilic liquid comprising:
(i) at least one disk having outer surfaces to which hydrophobic materials are attracted and retained said disk being mounted on a rotating shaft and disposed intermediate the end walls of the recovery compartment and disposed so that the disk is substantially normal to the surface of the liquid in said recovery compartment and as this disk is rotated it is partially immersed in said liquid, said attraction and retention being sufficient for said hydrophobic material to be lifted by said disk;
(ii) a bridge member carried in said recovery compartment;
(iii) at least one pair of flexible scraper blades mountable on the bridge member, each of said scraper blades when in engagement with the sides of the disk bent to provide a bias causing the disk engaging edges of said pair of blades to scrape the attracted hydrophobic material from the sides of the rotated disk after this disk emerges from the liquid and prior to the reentry of the rotated disk into the liquid, said scraper blades in a mounted condition adapted to engage the sides of the disk and to substantially equally restrain the rotating disk from unwanted movement;
(iv) means for removably securing the scraper blades to the bridge member so that the blades straddle the disk as it is rotated;
(v) a self-priming reciprocating pump disposed within said recovery compartment, said pump being for pumping out of the apparatus through a wall of the recovery compartment hydrophobic material scraped form said disk by said scraper blades;
(vi) at least one fluid conductor pipe adapted to receive the scrapings of hydrophobic material from a downward end of the blade and to carry said scrapings by gravity directly to said pump without a sump-collector and thereby provide said pump with positive head; and, (vii) motive power means for rotating the disk at a desired speed and direction and for powering said pump.

34. A method for separating hydrophobic materials in liquid state from an aqueous liquid or hydrophilic liquid, for separating debris from such liquids, or for purifying hydrophobic materials in the liquid state comprising:

(a) straining said liquid wherein the strainer comprises:
  a strainer for separating debris from liquid by having an influent flow of liquid flow into the strainer and an effluent flow of liquid flow out of the strainer after straining, said strainer comprising:
  a flow means for carrying the influent flow of liquid to the strainer;
  and, a hollow body comprising a removable, flexible strainer
(b) passing said effluent flow from said strainer to a recovery compartment, and
(c) subjecting said effluent flow in said recovery compartment to a means for separating and recovering hydrophobic liquid from hydrophilic liquid comprising:
  (i) at least one disk having outer surfaces to which hydrophobic materials are attracted and retained said disk being mounted on a rotating shaft and disposed intermediate the end walls of the recovery compartment and disposed so that the disk is substantially normal to the surface of the liquid in said recovery compartment and as this disk is rotated it is partially immersed in said liquid, said attraction and retention being sufficient for said hydrophobic material to be lifted by said disk;
  (ii) a bridge member carried in said recovery compartment;
  (iii) at least one pair of flexible scraper blades mountable on the bridge member, each of said scraper blades when in engagement with the sides of the disk bent to provide a bias causing the disk engaging edges of said pair of blades to scrape the attracted hydrophobic material from the sides of the rotated disk after this disk emerges from the liquid and prior to the reentry of the rotated disk into the liquid, said scraper blades in a mounted condition adapted to engage the sides of the disk and to substantially equally restrain the rotating disk from unwanted movement;
  (iv) means for removable securing the scraper blades to the bridge member so that the blades straddle the disk as it is rotated;
  (v) a reciprocating self-priming pump disposed within said recovery compartment, said pump being for pumping out of the apparatus through a wall of the recovery compartment hydrophobic material scraped from said disk by said scraper blades;
  (vi) at least one fluid conductor pipe adapted to receive the scrapings of hydrophobic material from a downward end of the blade and to carry said scrapings by gravity to said pump and thereby provide said pump with positive head; and,
  (vii) motive power means for rotating the disk at a desired speed and direction and for powering said pump.

* * * * *